United States Patent [19]
Williamson, Jr.

[11] 3,931,529
[45] Jan. 6, 1976

[54] TURN SIGNAL INDICATOR

[76] Inventor: Lonnie C. Williamson, Jr., 9103 White Oak Circle, Houston, Tex. 77040

[22] Filed: June 11, 1974

[21] Appl. No.: 478,211

[52] U.S. Cl. .................................. 307/119; 340/67
[51] Int. Cl.² .............................................. B60Q 1/00
[58] Field of Search ......... 180/103, 104; 200/61.27, 200/61.47; 340/67; 315/77, 83; 307/116, 119

[56] References Cited
UNITED STATES PATENTS
2,659,838  11/1953  DuRocher.......................... 315/77

*Primary Examiner*—Herman Hohauser
*Attorney, Agent, or Firm*—Howard I. Podell

[57] ABSTRACT

A turn signal for use on a motorcycle which incorporates means for automatic cancellation of the signal during completion of a turn. A normally open momentary contact push button switch is located on each side of the handle of the motorcycle, with each such push button switch in series with a self-latching relay that when energized switches on the appropriate turn indicator lamp. A mercury, normally closed, switch in series with the relay coil is mounted on each side of the handle and opens the relay coil circuit under the momentum of a turn to open the indicator lamp circuit.

2 Claims, 3 Drawing Figures

TURN SIGNAL INDICATOR

SUMMARY OF THE INVENTION

My invention relates to a control device for a vehicle turn signal, and particularly to a control device for the turn signals for motorcycles. A N.O. momentary contact push button switch is mounted on each side of the motorcycle handlebar. When either switch is closed, it causes a connected layer to latch, activating the flasher unit, and energizing the appropriate turn indicator lamp. The relay is deenergized by the opening of an N.C. mercury switch located in the push-button housing, which opens under the momentum of a turning vehicle. A capacitor is connected in parallel with the mercury switch contacts, serving as an anti-jitter element, by preventing the unit from de-activating as a result of a momentary change in switch position.

BRIEF DESCRIPTION OF THE DRAWING

The objects and features of the invention may be understood with reference to the following detailed description of an illustrative embodiment of the invention, taken together with the accompanying drawings in which.

DESCRIPTION OF THE PREFERRED EMBODIMENT

Figure 2:
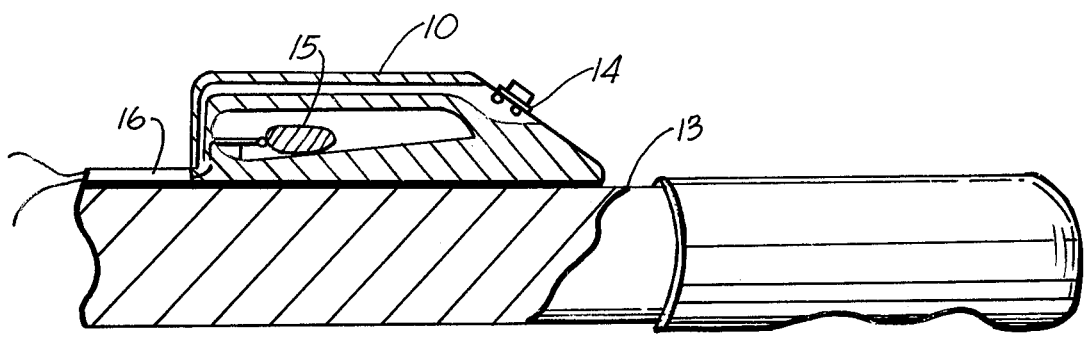
FIG. 2 is a side sectional view of the switch housing.
Figure 1:
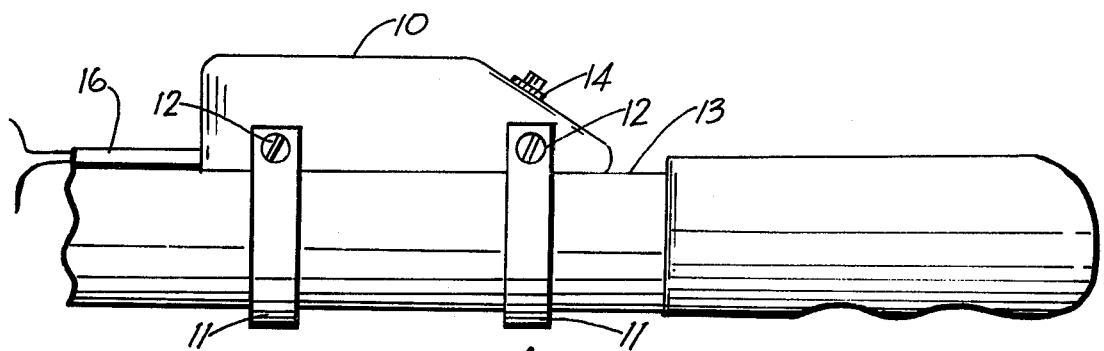
FIG. 1 is a side elevation view of switch housing on handlebar.

Turning now descriptively to the drawings, in which similar reference characters denote similar elements throughout the several views, FIGS. 1 and 2 illustrate a switch housing 10 fastened by clamps 11 and screws 12 to each handle 13 of the handlebar of a motorcycle. A momentary push-button switch 14, with normally open contacts, and a mercury switch 15 with normally closed contacts are contained in the housing 10. Wire leads 16 from the housing 10 lead to a control box with a circuit as shown in FIG. 3 connected to each set of leads 16.

Figure 3:
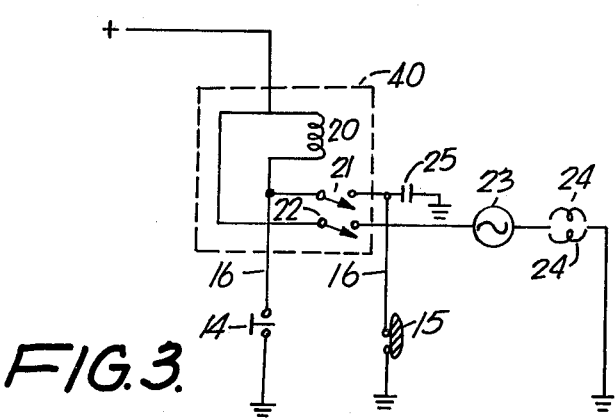
FIG. 3 is a schematic drawing of the circuit of one side of the device.

As shown in FIG. 3, the N.O. contacts of each switch 14 are connected in series between the ground and the coil 20 of a relay 40. One set of N.O. contacts 21 of a relay 40 are in series with the power supply and flasher device 24 and an indicator light 23. The other N.O. contact 22 of the relay 40 acts to latch the relay 40 in the ON mode is series with the N.C. mercury switch 15. A condensor 25 is located in parallel with mercury switch 15 to prevent momentary operation of mercury switch 15 from breaking the circuit to coil 20.

The circuit of FIG. 3 is duplicated for each side of the equipped vehicle, with one circuit connected to through wires 16 to the switch unit 10 on the right handle 13 and to the right side indicator light 23 and the other circuit connected to the switch unit 10 and indicator light 23 on the left side of the vehicle.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A turn signal indicator switch assembly for use on a motor cycle comprising a housing fitted with clamps for fastening to a motorcycle handlebar, adjacent to a hand grip of the handlebar a momentary contact push button, normally open switch mounted in said housing, with the switch button projecting beyond the housing, and a mercury switch mounted in said housing, in the normally closed position for the installed position of the assembly, such that the normally open push button switch may be connected in series with the coil of a self-latching relay that controls an electrical turn indication signal and the mercury switch may be connected in series with the self-latching circuit of the said relay so that momentary actuation of the push button switch causes the self-latching relay to close and remain close, thus actuating the turn indicator signal and movement of mercury in the mercury switch, responsive to turning motion of the handlebar, causes the said relay to open and turn off the said indicator signal.

2. The combination as recited in claim 1, in which the mercury switch is connected in parallel with a condensor to provide a time-delay action so that transient momentary operation of the mercury switch will not cause the relay, in the latched position, to open.

* * * * *